Patented Sept. 25, 1934

1,974,845

UNITED STATES PATENT OFFICE 1,974,845

MANUFACTURE OF ORGANIC ACID CHLORIDES

Erik Clemmensen and Roy M. Miller, St. Louis, Mo., assignors, by mesne assignments, to Monsanto Chemical Company, a corporation of Delaware No Drawing. Application August 10, 1931, Serial No. 556,316

9 Claims. (Cl. 260—123)

This invention relates to the manufacture of organic acid chlorides according to which an anhydride is caused to react with chlorine in the presence of phosphorus trichloride.

Heretofore it has been customary to prepare acid chlorides by reacting phosphorus pentachloride with the acid. In accordance therewith benzoyl chloride has been made by causing benzoic acid to react with a mol equivalent of phosphorus pentachloride. Inasmuch as phosphorus pentachloride is solid and difficult to handle as well as store, this method of manufacture is objectionable particularly when the process is to be conducted on a large scale. Moreover, hydrogen chloride is formed as one of the products of the reaction, which has practically no by-product value particularly when compared to the cost of the pentachloride.

It has likewise been proposed to manufacture phthalyl chloride by heating phthalic anhydride with phosphorus pentachloride. Certain disadvantages are inherent in this procedure. Thus for example thorough mixing of the reactants is difficult since both remain solid even at relatively high temperatures. Furthermore, the fact that pentachloride is solid and cannot be melted at atmospheric pressure without decomposition renders the procedure involving its use extremely difficult and otherwise objectionable.

We have discovered that it is unnecessary to prepare solid phosphorus pentachloride for the purpose of forming acid chlorides. Thus according to the present invention acid chlorides are prepared by introducing chlorine into a mixture of phosphorus trichloride and an acid anhydride at ordinary or slightly elevated temperatures; the reaction proceeds smoothly yielding the acid chloride and phosphorus oxychloride in substantially quantitative proportions. The phosphorus oxychloride may be separated conveniently from the acid chloride by fractional distillation or in any other suitable manner. If desired, one may chlorinate phosphorus trichloride partially or completely to the pentachloride in the presence of phosphorus oxychloride which functions as a solvent before adding the anhydride to the mixture. In either case the final products of the reaction are the same, namely, the acid chloride and the phosphorus oxychloride.

The object of the invention, therefore, is to provide a novel method of manufacturing acid chlorides which avoids the formation of relatively valueless by-products and which avoids the necessity of using solid phosphorus pentachloride.

Taking phthalic anhydride as an example, the reaction may be represented as follows:

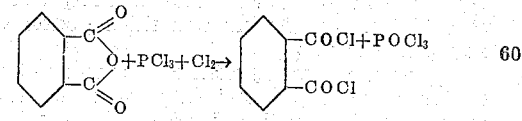

The following examples will serve to illustrate the application of the principles of the present invention:

*Example 1.*—Phthalyl chloride is made by charging equal molar proportions of phosphorus trichloride and phthalic anhydride into a flask, equipped with a reflux condenser. Chlorine gas is then bubbled into the liquid trichloride until all of the solid phthalic anhydride disappears. The reaction proceeds slowly at ordinary temperatures. However, at temperatures approximating the boiling point of the trichloride the reaction proceeds rapidly and may be employed advantageously. After the phthalic anhydride has disappeared, the introduction of chlorine is continued for a short period of time, preferably at higher temperatures (100°–160° C.) until the chlorine is no longer absorbed by the liquid in order to insure complete conversion of the phthalic anhydride. The reacted mixture is then distilled fractionally, the phosphorus oxychloride being recovered first as a substantially colorless liquid, having a boiling point of 107°–108° C. The phthalyl chloride, which remains in the flask, is a liquid at ordinary temperatures and may be purified, if desired, by distillation, although for many uses this step will be found to be unnecessary. The yield will be found to be substantially quantitative.

*Example 2.*—Maleic anhydride, which may be prepared in any desired manner, may be converted into maleyl chloride in a manner analogous to that set forth in Example 1. For the preparation of phthalyl chloride by substituting an equal mol proportion of maleic anhydride for the phthalic anhydride.

*Example 3.*—Succinyl chloride is prepared conveniently in a manner analogous to that described in connection with the preparation of phthalyl chloride in Example 1, by substituting a mol equivalent of succinic anhydride for phthalic anhydride.

*Example 4.*—Benzoyl chloride is prepared from benzoic anhydride, phosphorus trichloride and chlorine in a manner analogous to that described in Example 1; the products of reaction (benzoyl chloride and phosphorus oxychloride) being separated conveniently by fractional distillation.

*Example 5.*—In the foregoing examples the phosphorus compound has been added in the form of phosphorus trichloride. If desired, one may substitute phosphorus for the phosphorus trichloride. The reaction may be represented as follows:

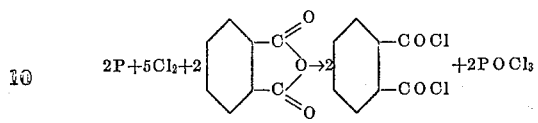

The phosphorus probably reacts first with the chlorine to form the trichloride, after which the anhydride reacts with the trichloride and additional chlorine to form the acid chloride and the phosphorus oxychloride. For practical purposes, the two reactions are effected in separate vessels. However, it is equally possible to chlorinate elemental phosphorus in the presence of the anhydride. For this purpose, a heel of the liquid reaction product consisting of the phosphorus oxychloride and the acid chloride or phosphorus trichloride may be retained in the reaction vessel advantageously.

From the foregoing examples, it will be apparent that we have provided a novel method of manufacturing acid chlorides whereby one is enabled to obtain not only the acid chloride without the formation of substantially valueless products, but in addition one obtains a valuable product, namely, phosphorus oxychloride. The method of procedure is relatively simple requiring but little supervision. The products of the reaction are formed in substantially quantitative yields and in a pure condition. Although a number of examples have been set forth, it will be apparent to those skilled in the art that the invention is generally applicable to the manufacture of acid chlorides and that it contemplates broadly the production of organic acid chlorides by reacting an organic acid anhydride with phosphorus or phosphorus trichloride and chlorine.

What we claim is:

1. The method of manufacturing organic acid chloride having a hydrocarbon nucelus which comprises causing chlorine to react with a mixture of phosphorus trichloride and an organic acid anhydride corresponding to said acid chloride.

2. The method of manufacturing phthalyl chloride which comprises causing chlorine to react with a mixture of phosphorus trichloride and phthalic anhydride.

3. The method of manufacturing aromatic organic carboxylic acid chloride having a hydrocarbon nucleus and phosphorus oxychloride simultaneously which comprises causing chlorine to react with a mixture of an organic carboxylic acid anhydride corresponding to said acid chloride and phosphorus trichloride.

4. The method which comprises causing an organic carboxylic acid anhydride having a hydrocarbon nucleus and chlorine to react with a substance chosen from a group consisting of phosphorus trichloride and phosphorus.

5. The method of manufacturing maleyl chloride which comprises causing maleic anhydride, chlorine and phosphorus trichloride to interact.

6. The method of manufacturing succinyl chloride which comprises causing succinic anhydride, chlorine and phosphorus trichloride to interact.

7. The method of manufacturing an organic carboxylic acid chloride having a hydrocarbon nucleus and phosphorus oxychloride simultaneously which comprises chlorinating phosphorus trichloride in the presence of phosphorus oxychloride and an acid anhydride corresponding to the organic acid chloride.

8. The method of manufacturing an organic acid chloride and phosphorus oxychloride which comprises adding chlorine to a mixture of an organic carboxylic acid anhydride corresponding to the organic acid chloride and phosphorus trichloride dissolved in phosphorus oxy chloride, said chlorine being added in an amount required theoretically to form the phosphorous pentachloride from the phosphorus trichloride present.

9. The method of manufacturing an acid chloride of a dicarboxylic organic acid having a hydrocarbon nucleus which comprises reacting chlorine with a mixture of phosphorus trichloride and the anhydride of the corresponding dicarboxylic organic acid.

ERIK CLEMMENSEN.
ROY M. MILLER.